United States Patent
Koss et al.

(10) Patent No.: US 8,641,802 B2
(45) Date of Patent: Feb. 4, 2014

(54) METHOD FOR TREATING A PROCESS GAS FLOW CONTAINING $CO_2$

(75) Inventors: Ulrich Koss, Zollikon (CH); Manfred Meyer, Friedrichsdorf (DE); Alexander Schriefl, Frankfurt am Main (DE)

(73) Assignee: LURGI GmbH, Frankfurt am Main (DE)

( * ) Notice: Subject to any disclaimer, the term of this patent is extended or adjusted under 35 U.S.C. 154(b) by 507 days.

(21) Appl. No.: 12/744,098

(22) PCT Filed: Sep. 5, 2008

(86) PCT No.: PCT/EP2008/007251
§ 371 (c)(1),
(2), (4) Date: Sep. 9, 2010

(87) PCT Pub. No.: WO2009/065453
PCT Pub. Date: May 28, 2009

(65) Prior Publication Data
US 2011/0000366 A1   Jan. 6, 2011

(30) Foreign Application Priority Data
Nov. 23, 2007 (DE) .......................... 10 2007 056 625

(51) Int. Cl.
*B01D 53/14* (2006.01)

(52) U.S. Cl.
USPC ........ 95/42; 95/160; 95/163; 95/191; 95/207; 95/230; 95/232; 95/236; 95/237

(58) Field of Classification Search
USPC ............................................. 95/236
See application file for complete search history.

(56) References Cited

U.S. PATENT DOCUMENTS 7,918,926 B2 * 4/2011 Iijima et al. ..................... 96/234
2007/0231244 A1 * 10/2007 Shah et al. ................. 423/437.1

* cited by examiner

*Primary Examiner* — Duane Smith
*Assistant Examiner* — Cabrena Holecek
(74) *Attorney, Agent, or Firm* — Norris McLaughlin & Marcus PA

(57) ABSTRACT

From the $CO_2$-containing stream of process gas obtained in a process for the treatment of a $CO_2$-containing stream of process gas, which is obtained in the production of pure synthesis gas from raw gas in the partial oxidation of heavy oils, petroleum coke or wastes, or in the gasification of coal, or when processing natural gas or accompanying natural gas, $CO_2$ is removed physisorptively or chemisorptively, and the solvent loaded with $CO_2$ is expanded to a lower pressure for the desorption of $CO_2$. In order to generate $CO_2$ as pure as possible, the contaminated $CO_2$ is condensed to at least 60 bar[a] or below its critical temperature to at least 70 bar[a], and the impurities contained in the liquid $CO_2$ are removed by stripping with gaseous $CO_2$ guided in counterflow.

4 Claims, 1 Drawing Sheet

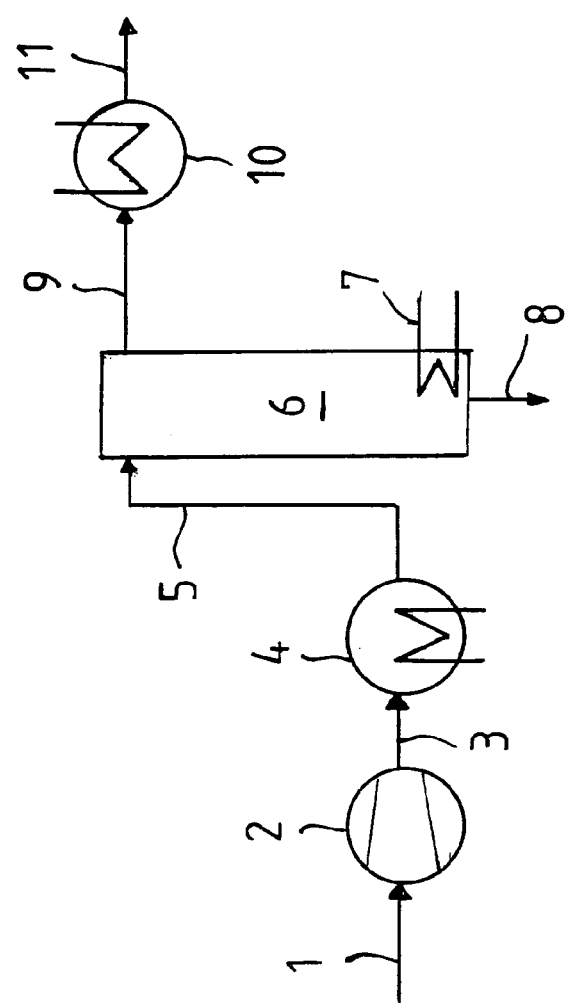

METHOD FOR TREATING A PROCESS GAS FLOW CONTAINING CO₂

This application is a 371 application of PCT/EP2008/007251 filed Sep. 5, 2008, which claims priority to the German application DE 10 2007 056 625.7 filed Nov. 23, 2007.

BACKGROUND OF THE INVENTION

Description

This invention relates to a process for the treatment of a $CO_2$-containing stream of process gas, which is obtained in the production of pure synthesis gas from the raw gases of the partial oxidation of heavy oils, petroleum coke or wastes, or in the gasification of coal, or when processing natural gas or accompanying natural gas, from which process gas stream $CO_2$ is removed physisorptively or chemisorptively, the solvent loaded with $CO_2$ is expanded to a lower pressure, and $CO_2$ is desorbed.

The processes known under the names RECTISOL®, PURISOL®, SELEXOL®, aMDEA® and hot potash washing serve the production of pure synthesis gas from the raw gases of the partial oxidation of heavy oils, petroleum coke or wastes, or from the gasification of coal or from the processing of natural gas or accompanying natural gas.

In the RECTISOL® process, raw gas from the partial oxidation of heavy oils, petroleum coke or wastes, or from the gasification of coal, is used as starting material. Beside the desired product components $H_2$ and CO, the raw gas contains $CO_2$, $H_2O$, $H_2S$, $CS_2$, COS, HCN, $NH_3$, organic sulfur compounds, metal carbonyls and hydrocarbons as undesired product components which must be separated, for which purpose cold methanol is used as physical solvent. Subsequently, the absorbed product components are desorbed again by pressure reduction and boiling off the solvent and treated in processing plants. Since the solubilities of the undesired product components in cold methanol are very different, a selective separation of the product components, for instance of $H_2S$ and $CO_2$, is possible. The cooled raw gas is supplied to an $H_2S$ absorber operating with a pressure of 30 to 60 bar and with cold $CO_2$-loaded methanol, in whose prewashing stage impurities such as HCN and $NH_3$ initially are removed. In the second stage of the $H_2S$ absorber, $H_2S$ and the other sulfur compounds are absorbed, so that the residual sulfur content is 0.1 ppm. The loaded methanol leaving the $H_2S$ absorber is expanded to a medium pressure, and the gases $H_2$ and CO desorbed thereby are recirculated into the raw gas. Subsequently, the methanol is heated to boiling temperature and "boiled off"; in the process, all absorbed gases are released, and the gas rich in $H_2S$ is charged to a Claus plant for recovering sulfur. Part of the CO contained in the synthesis gas free from sulfur is converted to $CO_2$, so that the $CO_2$ concentration typically rises to about 33%. Subsequently, the cooled gas is supplied to a two-stage $CO_2$ absorber. The loaded methanol discharged from the $CO_2$ absorber is expanded to a lower pressure and cooled thereby. The $CO_2$ released thereby is free from sulfur and can either be discharged to the atmosphere or be used e.g. for the production of urea. The synthesis gas obtained in the $CO_2$ absorber with a $CO_2$ concentration of about 3% is introduced into the methanol synthesis. In the PURISOL® process, N-methyl-2-pyrrolidone (NMP) is used as physical solvent instead of methanol. The $CO_2$ from the raw gas is expanded into the gas turbine by performing work. The SELEXOL® process is a process for acid gas removal using a solvent of dimethyl ethers of polyethylene glycol.

In the aMDEA® process, the raw gas to be treated enters at the bottom of an absorption column with a structured or dumped packed bed, in which the raw gas is countercurrently washed with a cooled aqueous solution of methyldiethanolamine (MDEA) supplied at the top of the absorption column, which contains an activating agent (a) for increasing the yield of $CO_2$. At the top of the absorption column, the purified gas is withdrawn. The aMDEA solution loaded with $CO_2$ and $H_2S$, which is discharged at the bottom of the absorption column, can either be heated directly or upon expansion to a lower pressure. As heat source, hot regenerated aMDEA solution from the regeneration column is used. In the regeneration column, the loaded aMDEA solution is regenerated completely by reheating and upon cooling is recirculated to the top of the absorption column. At the top of the regeneration column, a gas stream containing $CO_2$ and $H_2S$ is withdrawn. The separated gas rich in $H_2S$ is supplied either to a Claus plant or to a postcombustion. The different reaction rates of the amines for $H_2S$ and $CO_2$ form the basis for a selective absorption of $H_2S$ and for the separation of $CO_2$.

The disadvantage of the above-mentioned physisorptively and chemisorptively operating absorption processes for removing the undesired components CO, $H_2O$, $H_2S$, COS, HCN, $NH_3$, organic sulfur compounds, metal carbonyls and hydrocarbons contained in the raw gas from the partial oxidation of heavy oil, petroleum coke and wastes, from the gasification of coal and from the processing of natural gas and accompanying natural gas consists in that the $CO_2$ produced still contains 0.1 to 20 vol-%, in particular 0.5 to 2.5 vol-%, of one or more of the components $N_2$, CO, $H_2$ and $CH_4$ and therefore is not suitable for a number of applications.

SUMMARY OF THE INVENTION

It is the object of the present invention to develop the process described above such that the $CO_2$ obtained from a raw gas by means of a physisorptively or chemisorptively operating absorption process has a purity as high as possible and can directly be used as valuable product; in particular, the $CO_2$ should meet the quality requirements for compaction in petroleum deposits for an improved oil recovery while at the same time finally storing the $CO_2$ in the petroleum deposits.

This object is solved in that the $CO_2$ contaminated with a total of 0.1 to 20 vol-%, preferably 0.5 to 10 vol-%, in particular 0.5 to 2.5 vol-% of one or more of the components $N_2$, CO, $H_2$ and $CH_4$ is condensed at room temperature to a pressure of at least 60 bar[a] or below the critical temperature of $CO_2$ of 31° C. to at least 70 bar[a] and the $CO_2$-containing gaseous impurities obtained thereby, which chiefly have a liquid condition, are removed by stripping the $CO_2$ with gaseous $CO_2$ used as stripping gas, and $CO_2$ is obtained as a liquid. During stripping, the impurities are removed from the liquid $CO_2$ by passing through the stripping gas against the flow direction of the liquid $CO_2$ and are transferred into the stripping gas, since the vapor pressure of the impurities to be removed from the liquid $CO_2$ is greater than in the stripping gas and therefore a transfer is effected from the liquid $CO_2$ into the stripping gas.

In accordance with this aspect of the process, the $CO_2$ is condensed to a pressure of 10 to 30 bar and cooled to a temperature of −40 to −5° C.

For generating the stripping gas, a corresponding amount of the liquid $CO_2$ present in the bottom of the column is evaporated continuously.

The stripping gas containing the impurities is expelled at the top of the stripping column and recooled in accordance with a further feature of the invention, in order to condense at least part of the $CO_2$ out of the stripping gas and recirculate the same to the bottom of the stripping column.

One aspect of the invention consists in that the loaded stripping gas is introduced into the absorption stage of the process.

BRIEF DESCRIPTION OF THE DRAWINGS

The process of the invention will subsequently be explained in detail by means of an embodiment in conjunction with a basic flow diagram illustrated in the drawing.

DETAILED DESCRIPTION OF THE INVENTION

From raw gas obtained by partial oxidation of heavy oil, the undesired components $CO_2$, $H_2O$, $H_2S$, COS, HCN, $NH_3$, organic sulfur compounds, metal carbonyls, $C_nH_m$ and further impurities, such as resin formers and mercaptans, are absorbed by the RECTISOL® process, typically by using methanol. By adding steam, a large part of the CO of the synthesis gas largely purified from undesired components and impurities by the RECTISOL® process is catalytically converted to $CO_2$ and further $H_2$.

The $CO_2$ still containing a total of 2.0 vol-% of $N_2$, CO, $H_2$ and $CH_4$ as impurities is separated from the purified synthesis gas and via conduit (1) charged to a compressor (2), in which the $CO_2$ is condensed to a pressure of 25 bar[a], and subsequently supplied via conduit (3) to a cooling plant (4), in which the $CO_2$ is cooled to a temperature of −25° C. Under these conditions, the $CO_2$ is almost completely transferred into the liquid condition, whereas the components contaminating the $CO_2$ remain gaseous almost completely. Via conduit (5), the liquid $CO_2$ is supplied to the top of a stripping column (6) and in counterflow with gaseous $CO_2$ used as stripping gas is passed through the stripping column (6), in whose bottom the stripping gas is generated by evaporating a small amount of liquid $CO_2$ by means of a suitable heat source (7). By means of the stripping gas, the impurities are removed from the liquid $CO_2$ and transferred into the gaseous $CO_2$. At the bottom of the stripping column (6), liquid pure $CO_2$ is withdrawn via conduit (8). The stripping gas containing the impurities, which is withdrawn at the top of the stripping column (6), can be supplied via conduit (9) to a cooling plant (10), in which part of the $CO_2$ is condensed. The remaining stripping gas loaded with the impurities is supplied to the raw synthesis gas via conduit (11). If the $CO_2$ content of the remaining amount of stripping gas is too high and hence a recirculation of the raw synthesis gas is uneconomic, the stripping gas can be recirculated into the process, for instance into the RECTISOL® process, for the production of pure synthesis gas and can be completely liberated from $CO_2$ by absorption in a suitable absorption column together with the expansion gas stream of the process to be recirculated. As a cooling plant for liquefying the $CO_2$, there can also be employed the cooling plant used in connection with this process. Moreover, there is a possibility for cold exchange with corresponding streams of the process.

The data for the temperatures, pressures and composition of the substance streams as determined with a practical embodiment of the invention are indicated in the following table with reference to the basic flow diagram illustrated in the drawing:

| | Conduit | | | | |
|---|---|---|---|---|---|
| | 1 | 3 | 5 | 8 | 9 |
| Temperature (° C.) | 20 | 20 | −25 | −25 | −25 |
| Pressure (bar[a]) | 1 | 25 | 25 | 25 | 25 |
| Composition vol-% (calculated dry) | | | | | |
| $N_2$ | 1.0 | 1.0 | 1.0 | traces | 16 |
| $H_2$ | 0.5 | 0.5 | 0.5 | traces | 8 |
| CO | 0.5 | 0.5 | 0.5 | traces | 8 |
| $CH_4$ | 3.0 | 3.0 | 3.0 | traces | 48 |

The advantages achieved with the invention in particular can be seen in that virtually the entire $CO_2$ is obtained in pure form and the losses of the valuable gases CO, $H_2$ and $CH_4$ are reduced to zero.

The invention claimed is:

1. A process for the treatment of a $CO_2$-containing stream of process gas, wherein the process comprises (a) obtaining a process gas from the production of pure synthesis gas from raw gas obtained in the partial oxidation of heavy oils, petroleum coke or wastes, or in the gasification of coal, or when processing natural gas or accompanying natural gas, in which process gas is a $CO_2$-containing stream, (b) removing the $CO_2$-containing stream by means of a physisorptively or chemisorptively operating absorption process from the process gas stream with a solvent, (c) expanding the solvent loaded $CO_2$ containing stream to a lower pressure in order to desorb the $CO_2$-containing stream, wherein the desorbed $CO_2$-containing stream comprises 0.1 to 20 vol-% of one or more impurities selected from the group consisting of $N_2$, CO, $H_2$ and $CH_4$, (d) condensing the desorbed $CO_2$-containing stream at room temperature to a pressure of at least 60 bar[a], or condensing the desorbed $CO_2$-containing stream at a temperature below 31° C. to at least 70 bar[a], (e) removing the impurities from the condensed, desorbed $CO_2$-containing stream by stripping the $CO_2$ in a stripping column with a stripping gas comprising gaseous $CO_2$ guided in counterflow in order to remove the impurities from the $CO_2$ by transferring the impurities to the stripping gas, and (f) after removing the impurities with the stripping gas, the stripping gas comprising the impurities is recooled in order to condense at least part of the $CO_2$ out of the stripping gas and recirculating the condensed $CO_2$ to the bottom of the stripping column.

2. The process according to claim 1, wherein $CO_2$ contaminated with a total of 0.5 to 10 vol-% of one or more of $N_2$, CO, $H_2$ and $CH_4$ is used.

3. The process according to claim 1, wherein after the impurities are removed from the condensed, desorbed CO2-containing stream by the gaseous CO2, the gaseous CO2, loaded with one or more of the components N2, CO, H2 and CH4 is added to the raw gas.

4. The process according to claim 1 wherein the gaseous $CO_2$ loaded with one or more of the components $N_2$, CO, $H_2$ and $CH_4$ is introduced into the absorption process.

* * * * *